April 9, 1968     J. T. GRESHAM ET AL     3,377,224
METHOD OF EMBOSSING DIFFERENTIALLY CREPED TISSUE PAPER
Original Filed June 8, 1961     2 Sheets-Sheet 1
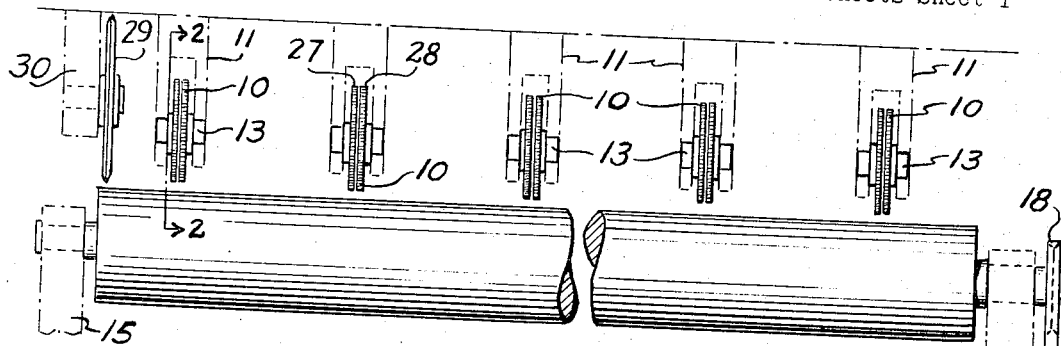
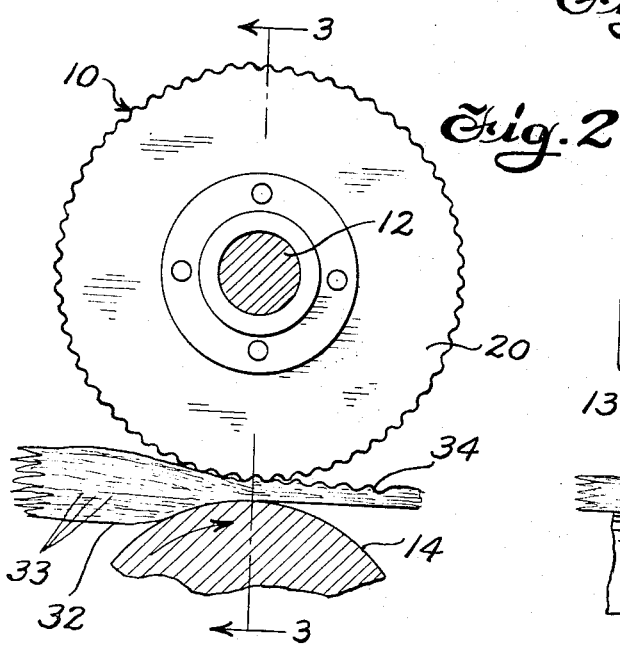
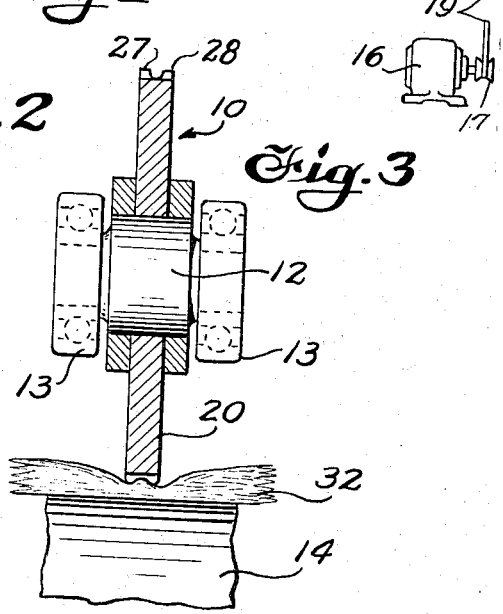
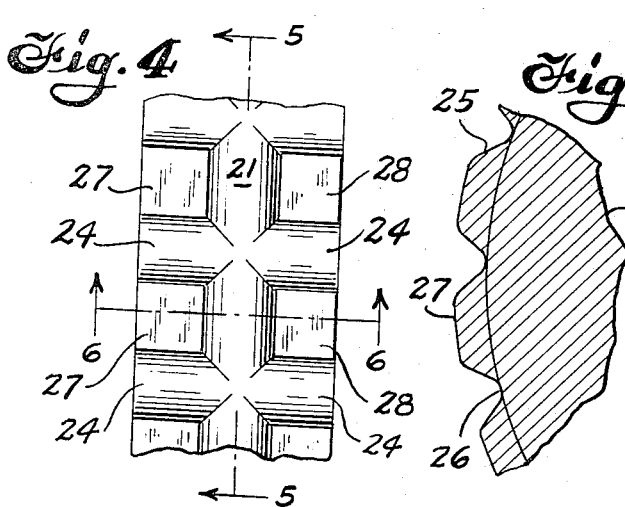
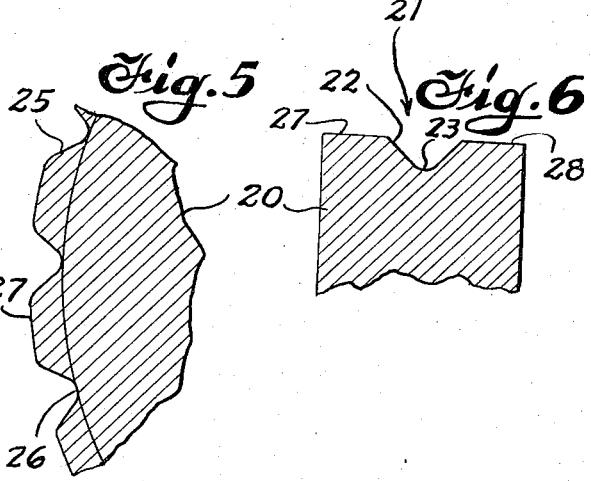
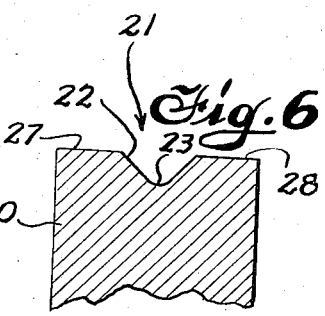

ately square and is 1/32 inch x 1/32 inch in size. The
United States Patent Office 3,377,224
Patented Apr. 9, 1968

3,377,224
METHOD OF EMBOSSING DIFFERENTIALLY CREPED TISSUE PAPER
James T. Gresham, Appleton, and Gordon D. Thomas, Neenah, Wis., assignors to Kimberly-Clark Corporation, Neenah, Wis., a corporation of Delaware
Continuation of application Ser. No. 115,682, June 8, 1961. This application Mar. 11, 1966, Ser. No. 543,441
2 Claims. (Cl. 156—209)

This application is a continuation of our copending application, Ser. No. 115,682, filed June 8, 1961, for "Method and Apparatus for Embossing," now abandoned.

The invention relates to papermaking machinery and, more particularly, to embossing mechanism suitable for fixing together plies of thin creped paper or wadding, which, due to its high bulk, is particularly useful for packing purposes. Still more particularly, the invention relates to embossing mechanism which is particularly suitable for embossing together lightweight paper plies at least portions of which are creped to only a slight extent, as distinguished from tissue which is finely creped.

It has previously been proposed to provide a plurality of spaced rotatably mounted embossing discs or wheels operable to emboss finely creped paper piles for bonding them together by running the material between a driven roll and the discs. Some of these discs have been composed of disc portions which are continuous on their periphery and notched disc portions along side of and in contact with the continuous disc portions for bonding the plies of material without unduly stretching or elongating the material along the lines of embossing.

Embossing wheels of this prior type, however, were not found to be entirely satisfactory to bond together the plies of coarsely creped paper tissue or the coarsely creped portions of differently creped tissue paper (such as is, for example, described in Canadian Patent 605,951, issued on Sept. 27, 1960, to Edward H. Voigtman, Charles A. Lamb and Harold F. Donnelly).

It is accordingly an object of the invention to provide an improved embossing wheel and, more particularly, an improved peripheral pattern on such a wheel which provides good ply attachment of uncreped paper tissue or coarsely creped paper tissue. More particularly, it is an object to provide such an improved pattern which includes spaced rows of spaced bosses on the periphery of an embrossing wheel that are operative to provide very high unit pressures to give good ply attachment of such paper tissues without substantial cutting of the material on the lines of embossing.

The invention consists of the novel constructions, arrangements and devices to be hereinafter described and claimed for carrying out the above stated objects, and such other objects, as will be apparent from the following description of preferred forms of the invention, illustrated with reference to the accompanying drawings, wherein:

FIG. 1 is a plan view of a plurality of embossing wheels, aligned opposite an anvil roll and incorporating the principles of the invention;

FIG. 2 is a sectional view on an enlarged scale taken on line 2—2 of FIG. 1;

FIG. 3 is a sectional view taken on line 3—3 of FIG. 2;

FIG. 4 is an elevational view on a still further enlarged scale of the edge of one of the embossing wheels;

FIG. 5 is a sectional view taken on line 5—5 of FIG. 4;

FIG. 6 is a sectional view taken on line 6—6 of FIG. 4;

Like charcaters of reference designate like parts in the several views.

Figure 7:
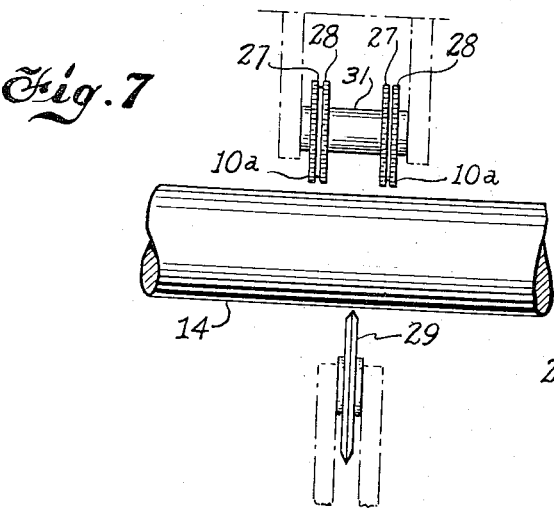
FIG. 7 is a plan view of another arrangement of embossing wheels incorporating the principles of the invention.

Referring now to FIGS. 1–6 of the drawings, in which like characters of reference designate like parts in the several views, the illustrated embossing apparatus may be seen to comprise a plurality of coaxially disposed embossing wheels 10, each of which is rotatably mounted with respect to fixed supporting structure, such as a pair of stationary arms 11. A shaft 12 extends through each of the wheels 10 and into bearings 13 which are countersunk into the arms 11.

An anvil roll 14 is rotatably mounted in a frame 15 so that the roll axis lies parallel to the axes of the embossing rolls 10. The roll 14 is driven by any suitable mechanism, such as a motor 16 that is connected with the roll 14 by means of pulleys 17 and 18 and a belt 19.

Each of the embossing wheels 10 is made up of a sheet metal disc 20 that is grooved on its periphery. Each disc 20 is provided on its peripheral edge with a central groove 21 which preferably has straight sides 22 and a central rounded bottom or fillet 23, as seen in FIG. 6. Each disc 20 on its peripheral edge is also provided with a plurality of spaced grooves 24 extending parallel to the axis of the wheel 10 from one side of the wheel to the other. Each groove 24 preferably has a cross section similar to that of the groove 21 with relatively straight sides 25 and a rounded bottom or fillet 26 (see FIG. 5). The peripherally extending groove 21 and the transversely extending grooves 24 in each disc 20 define substantially flat protrusions or bosses 27 and 28 adjacent opopsite sides of the disc. The bosses 27 are in a row on one side, and the bosses 28 are in a row on the other side, being spaced by the central peripheral groove 21.

The embossing wheels 10 may be of many different sizes, however, a size that has been found to be very satisfactory is one of about 4 inches in diameter and a thickness of 3/32 inch. Each of the bosses 27 and 28 is preferably square and is 1/32 inch x 1/32 inch in size. The groove 21 likewise has a width of 1/32 inch, and the grooves 24 also have a width of 1/32 inch. The grooves 21 and 24 may have a depth, for example of 1/64 inch. The anvil roll 14 may have any suitable diameter, for example, 10 inches.

The anvil roll 14, as well as the discs 20, are preferably formed of iron or steel, but may, of course, be made of our materials if desired. The wheels 10 may be spaced apart any desired distance, such as from 4 inches to 40 inches, depending on the degree of embossing it is desired to give the material that is worked on. In the event that it is desired to slit the material worked on at the same time that the material is embossed, a slitter wheel 29 rotatably mounted on a stationary arm 30 may be provided.

It may be desirable to utilize two such wheels 10 in connection with a slitter 29 for simultaneously slitting and embossing. Such an arrangement is illustrated in FIG. 7. Two of the embossing wheels 10a are illustrated as being mounted on an arbor 31, and a slitter wheel 29 is mounted so as to slit along a line midway between the embossing wheels 10a. Although the spacing between the wheels 10a may be varied, a suitable spacing has been found to be about 7/16 inch, with an overall dimension axially of the wheels and including the wheels being 5/8 inch, since the wheels themselves are 3/32 inch in thickness.

The material 32 to be embossed comprises a plurality of plies 33. The material 32 may, for example, be creped wadding or tissue paper, which may be relatively clean or which may contain a certain amount of binding material, such as asphalt. The number of plies is quite variable, and the illustrated embossing apparatus has been found to work very satisfactorily with 10 to 35 plies, for example. A sheet of relatively thick uncreped backing paper 34 (see FIG. 8) may be provided as the external ply or not, as desired.

Referring to FIGS. 2 and 3, the material 32 passes between the anvil roll 14 and the embossing wheels 10 and is compressed therebetween to a substantial extent as the anvil roll 14 is driven. The embossing wheels each leave a relatively deep rut or groove in the surface of the material 32, and a characteristic impression is left in the wadding which corresponds to the pattern of bosses on the edges of the wheels 10 and comprises a plurality of square depressions of the same sizes as the bosses 27 and 28 disposed in a pair of spaced rows. The plies of the material, as the result of being so pressed together and being so embossed, subsequently adhere to each other and are bonded together so that a unitary product is produced. Since the embossing wheels 10 are substantially spaced from each other, the creped wadding has substantial thickness between the embossed grooves, so that the wadding as a product has substantial bulk and is very suitable for packaging, for example.

Figure 9:
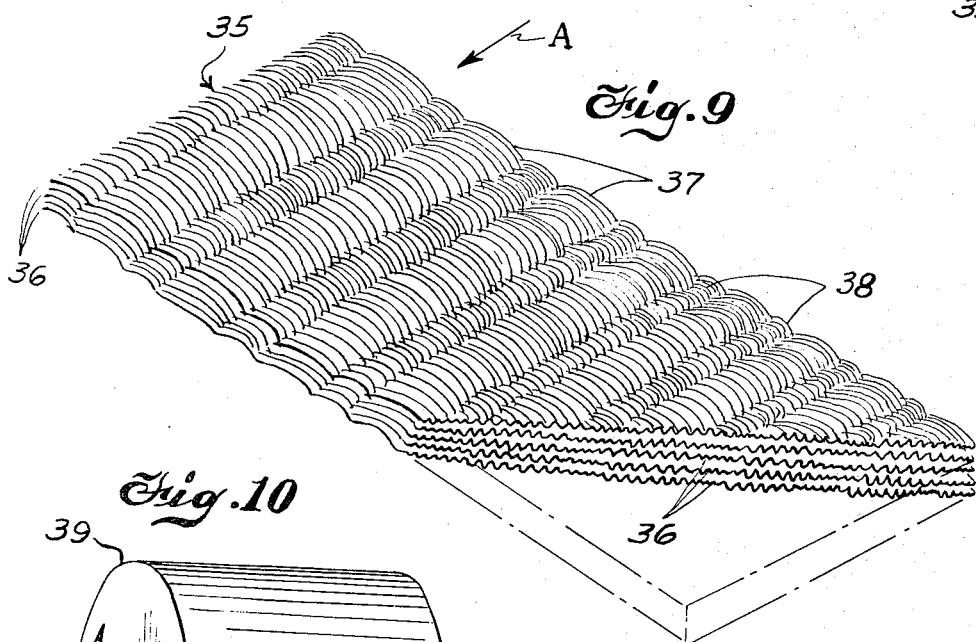
FIG. 9 is a perspective view of differentially creped tissue product for use with the embossing mechanisms shown in the prior figures.

The illustrated embossing wheels 10, having the two rows of bosses 27 and 28 on their peripheries, have been found particularly suitable for attaching together the plies of a wadding material 35, the plies of which are unevenly or differentially creped. Such a material is illustrated in FIG. 9, and this material is preferably run between the wheels 10 and anvil roll 14 in the direction indicated by the arrow A in FIG. 9. The details of such an unevenly creped wadding material, including methods for making this material, are disclosed in the above mentioned Canadian Patent 605,951; and, therefore, specific details will not be set forth here. Suffice it to say, referring to FIG. 9, the material 35 comprises a plurality of superposed cellulosic tissue webs or sheets 36. The individual sheets are formed tissue webs having a basis weight, for example, on a bone dry basis, before differential creping, of about 3.5 pounds to 15 pounds per ream of 3000 square feet. For cushioning and insulating purposes, however, the preferred basis weight range is about 4.5 pounds to about 7.5 pounds per ream of 3000 square feet on a bone dry basis before differential creping.

Each of the cellulosic tissue webs or sheets 36 has a series of alternating coarsely creped strips 37 and more finely creped strips 38 extending in the direction indicated by the arrow A in FIG. 9 and constituting alternately puffed and flat areas which give the product unique properties. The finely creped areas function as stabilizers holding the arches of the coarsely creped areas 37 in place and enabling the latter to act as structural members to provide the product with high, stable bulk characteristics. As an example, the coarsely creped areas 37 of the plies of the tissue product should have between about 5 and about 30 crepes per inch and preferably between 10 and 20 crepes per inch. The more finely creped areas 38 of the respective plies should have between about 20 and 200 crepes per inch and preferably between about 30 and about 50 crepes per inch. These numbers refer to the product as it is wound onto the reel at the end of the papermachine and generally some stretching takes place as the sheets are plied up into the product to the extent of about 10 percent of their length.

Figure 10:
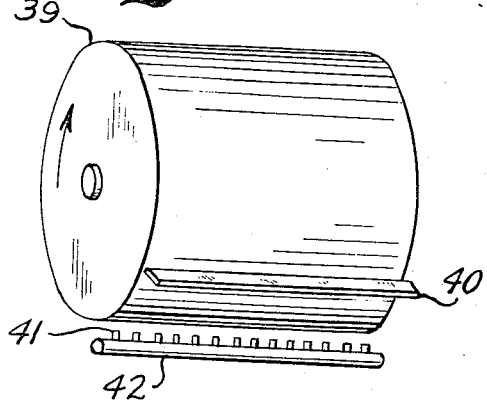
FIG. 10 is a perspective view of a drier drum of a paper machine equipped to make the differentially creped product illustrated in FIG. 9.

The webs or sheets 36 having the coarsely creped areas 37 alternating with the finely creped areas 38 may be manufactured by forming sheets or webs of tissue in a conventional manner and then differentially creping each of the tissue webs or sheets. A plurality of these individual sheets or webs are then assembled as plies into the unitary structure 35. A tissue sheet may be formed by a conventional water laying technique on the usual Fourdrinier type web forming equipment which includes a steam heated Yankee drier drum 39 (see FIG. 10) as the final element of the machine operating on the tissue. The tissue 36 is dried on the drum 39 and is creped from the surface of the drum by means of a conventional creping doctor blade 40. The differential creping is accomplished by applying a drier release agent onto the surface of the drum 39, as from a plurality of spaced microjets 41 carried by and connected with a conduit 42 carrying the drier release agent. This agent is preferably applied to the drum 39 just subsequent to the blade 40 as shown in FIG. 10. The release agent applied from the jets 41 forms a film on the surface of the dried drum 39 which is substantially absorbed by the tissue on the drum and which functions to release the tissue from the drum along the strips on the surface of the drum on which the release agent is applied forming the coarsely creped strips 37, and the doctor blade 40 is effective in its usual manner to crepe the tissue from the surface of the drum along only those strips on which the release agent has not been applied (forming the finely creped strips 38). The natural adherence of the tissue web to the surface of the drum 39 is materially reduced in those places where the release agent is present to cause the formation of the coarsely creped strips 37. The web travels with the drum 39 in the direction indicated by the arrow A in FIG. 9, and in being creped from the drum, the web assumes the differentially creped pattern as illustrated in FIG. 9 caused by the differential degree of adherence to the drier surface.

Many different release agents may be used for causing this differential creping action, such as emulsified mineral oil, sulfonated castor oil and the others mentioned in Canadian Patent 605,951, previously referred to.

Conventional embossing wheels used prior to the present invention have provided passable results in bonding the plies of uniformly finely creped tissue together; however, it was found that such prior embossing wheels were not at all satisfactory in causing ply adherence with the differentially creped tissue plies above described. This was apparently due to the fact that the areas 37 in the multi-ply product illustrated in FIG. 9 have substantially no creping or the fact that the drier release agent remained in these areas; so that, in these areas, the embossing wheels did not provide ply adherence sufficient for holding the plies together under normal usage. Insufficiency of ply adherence from prior conventional embossing wheels, particularly on the differentially creped product 35, may have been due also to the inability to apply a very high embossing pressure on the plies using the prior embossing wheels. The two rows of bosses 27 and 28 on the peripheries of the wheels 10 provide about 150 thousand pounds per square inch unit pressure with a relatively small force of 300 pounds applied to each of the wheels 10 (assuming a 4 inch diameter and 3/32 inch thickness of the wheels 10 with 1/32 inch x 1/32 inch bosses 27 and 28, used in connection with a 10 inch diameter anvil roll 14). This high unit pressure apparently provides a fiber to fiber bonding and a knitting or interlacing of the fibers of the individual plies in the product 35 so that effective bonding results. The double rows of bosses 27 and 28 on the wheels 10 assure that even with such high unit pressures, the plies of the material 35 are not substantially cut or severed. Also, with prior conventional embossing wheels, backing paper, such as uncreped paper 34, has not been very satisfactorily affixed to the other plies of the product. With the embossing wheel of the invention, effective fixing of the backing paper to the product has resulted.

Figure 8:
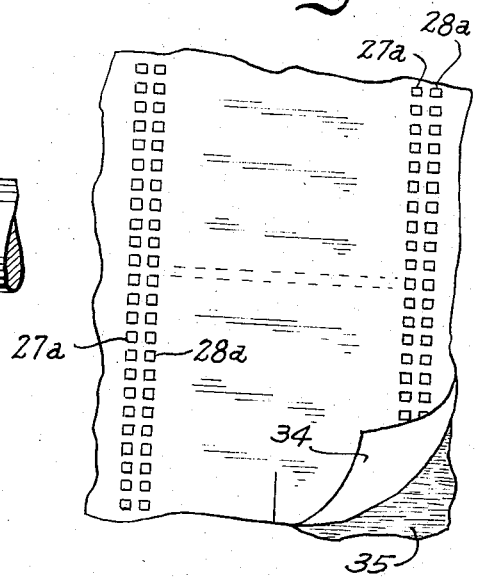
FIG. 8 is a plan view of some of the material operated on by the mechanism of FIG. 7.

The embossing mechanism illustrated in FIG. 7 functions in the same manner as that illustrated in the preceding figures; however, in this case, the illustrated slitter 29 is effective to slit the material into two main parts, and the embossing wheel 10a on each side assures that the plies of the material of each part at the edges are bonded together. FIG. 8 shows the embossed slitted end product provided by the mechanism of FIG. 7 which has the characteristic depressions 27a and 28a in the surface on which the wheels 10a are operative and which correspond and are provided by the bosses 27 and 28 in the periphery of the wheels. In the product of FIG. 8, the uncreped ply 34 is provided and the wheels 10a bond not only the plies 36 together but also bond the backing paper 34 to the other plies; however, it will be understood that the same depressions 27a and 28a in the surface operated on by the wheels 10 and 10a are provided by the wheels if the uncreped ply 34 is not used. Preferably, as illustrated in FIG. 8, for securing best results, the bosses 27 and 28 on one of the wheels 10a are staggered with respect to the bosses 27 and 28 on the other wheel 10a.

We wish it to be understood that the invention is not to be limited to the specific constructions and arrangements shown and described, except only insofar as the claims may be so limited, as it will be understood to those skilled in the art that changes may be made without departing from the principles of the invention.

What is claimed is:

1. In a method for fixing together without the use of adhesive a plurality of plies of differentially creped tissue paper which has a basis weight before creping of 4.5 to 7.5 pounds per ream of 3,000 square feet, each of said plies having a series of alternating coarsely creped strips and more finely creped strips constituting alternating puffed and flat areas, the steps which comprise, embossing and pressing the plies of tissue paper between a plurality of bosses and a smooth rigid surface, each of said bosses having a substantially flat surface and being substantially square and being about $\frac{1}{32}$ inch on each side and said bosses being disposed in two parallel rows which are spaced about $\frac{1}{32}$ inch apart and the bosses in each row being spaced from each other about $\frac{1}{32}$ inch, said pressing being done with a pressure of at least 150,000 pounds per square inch so as to bond the tissue paper plies to each other without the use of adhesive.

2. In a method of embossing and fixing together without the use of adhesive 10 to 35 plies of differentially creped tissue paper which has a basis weight before creping of 4.5 pounds to 7.5 pounds per ream of 3,000 square feet, each of said plies having a series of alternating coarsely creped strips and more finely creped strips constituting alternating puffed and flat areas, the steps which comprise, passing the plies between a smooth surfaced anvil roll and an embossing wheel which has an approximate diameter of 4 inches while rotating the wheel and roll, the peripheral edge of said embossing wheel having embossing protrusions disposed in two rows with the rows being spaced by a central peripheral groove and the protrusions in each row being spaced by grooves extending parallel with the axis of the wheel, said protrusions each having a substantially flat surface and being substantially square and being about $\frac{1}{32}$ inch on each side, said grooves being about $\frac{1}{32}$ inch wide and having a depth of about $\frac{1}{64}$ inch, and applying a force on said embossing wheel so that the pressure applied by said protrusions on the creped tissue paper as supported by said anvil roll is at least 150,000 pounds per square inch.

References Cited

UNITED STATES PATENTS

| | | | |
|---|---|---|---|
| 2,020,668 | 11/1935 | Wandel | 161—44 |
| 2,106,246 | 1/1938 | Fourness | 161—129 |
| 2,920,373 | 1/1960 | Gresham | 28—72.2 |
| 2,113,128 | 4/1938 | Cunnington | 156—219 XR |
| 2,118,169 | 5/1938 | Crouse | 161—124 XR |
| 2,596,292 | 5/1952 | Sackner | 161—124 |
| 2,834,703 | 5/1958 | Atkinson | 161—124 XR |

ROBERT F. BURNETT, *Primary Examiner.*

EARL M. BERGERT, ALEXANDER WYMAN,
*Examiners.*

R. H. CRISS, *Assistant Examiner.*